United States Patent
Dennis et al.

(10) Patent No.: US 11,673,218 B2
(45) Date of Patent: Jun. 13, 2023

(54) SAFETY BRAKING DEVICE

(71) Applicant: Robert Bosch GmbH, Stuttgart (DE)

(72) Inventors: Daniel Dennis, Nuertingen (DE);
Florian Esenwein,
Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/275,714

(22) PCT Filed: Sep. 20, 2019

(86) PCT No.: PCT/EP2019/075279
§ 371 (c)(1),
(2) Date: Mar. 12, 2021

(87) PCT Pub. No.: WO2020/064524
PCT Pub. Date: Apr. 2, 2020

(65) Prior Publication Data
US 2022/0055166 A1 Feb. 24, 2022

(30) Foreign Application Priority Data
Sep. 27, 2018 (DE) ...................... 10 2018 216 573.4

(51) Int. Cl.
*B60K 6/26* (2007.10)
*B23Q 11/00* (2006.01)
(Continued)

(52) U.S. Cl.
CPC ........ *B23Q 11/0092* (2013.01); *F16D 63/006* (2013.01); *F16D 67/02* (2013.01); *B27B 5/38* (2013.01); *F16D 11/10* (2013.01)

(58) Field of Classification Search
CPC ........ F16D 63/006; F16D 67/02; F16D 11/10; B27B 5/38; B23Q 11/0092; B25F 5/00
See application file for complete search history.

(56) References Cited

U.S. PATENT DOCUMENTS 3,572,482 A * 3/1971 Kalpas .................... F16D 67/02
192/223.1
4,440,277 A * 4/1984 Thomson ................ F16D 67/06
192/18 B (Continued)

FOREIGN PATENT DOCUMENTS

CN 201320751 Y 10/2009
CN 101627219 A 1/2010
(Continued)

OTHER PUBLICATIONS

International Search Report corresponding to PCT Application No. PCT/EP2019/075279, dated Jan. 23, 2020 (German and English language document) (6 pages).

*Primary Examiner* — Charles A Fox
*Assistant Examiner* — Farhana Pervin
(74) *Attorney, Agent, or Firm* — Maginot, Moore & Beck LLP

(57) ABSTRACT

A safety brake device for a power tool includes a decoupling device, configured to decouple an output unit from a drive unit during a braking operation thereby reducing at least one of a rotational mass and rotational energy of the output unit, and a brake device with a first brake device part and a second brake device part. The first brake device part is arranged on the output unit so as to allow essentially no relative rotation, and the second brake device part is configured to allow essentially no relative rotation with respect to the power tool. The first brake device part and the second brake device part are configured to interact mechanically with one another during a braking operation to stop rotation of the output unit. The first brake device part of the brake device is embodied in one piece with the decoupling device.

8 Claims, 3 Drawing Sheets

(51) Int. Cl.
 *F16D 63/00* (2006.01)
 *F16D 67/02* (2006.01)
 *B27B 5/38* (2006.01)
 *F16D 11/10* (2006.01)

(56) References Cited

U.S. PATENT DOCUMENTS

| | | | | |
|---|---|---|---|---|
| 4,836,362 A | * | 6/1989 | Bower | F16H 47/06 |
| | | | | 198/810.01 |
| 2002/0017179 A1 | | 2/2002 | Gass et al. | |
| 2003/0000791 A1 | * | 1/2003 | Moeller | A01D 69/10 |
| | | | | 192/15 |
| 2005/0167230 A1 | * | 8/2005 | Gumpoldsberger | F16D 11/10 |
| | | | | 192/69.7 |
| 2010/0146796 A1 | * | 6/2010 | Geromiller | A01G 3/053 |
| | | | | 30/223 |
| 2010/0147123 A1 | * | 6/2010 | Baumann | F16D 55/04 |
| | | | | 83/571 |
| 2014/0069756 A1 | * | 3/2014 | Esenwein | F16D 51/42 |
| | | | | 188/323 |
| 2018/0036812 A1 | | 2/2018 | Frolov et al. | |
| 2018/0036853 A1 | | 2/2018 | Frolov | |
| 2018/0306275 A1 | * | 10/2018 | Takeda | F16H 57/10 |

FOREIGN PATENT DOCUMENTS

| | | | | |
|---|---|---|---|---|
| CN | 103269833 A | | 8/2013 | |
| CN | 103967984 A | | 8/2014 | |
| DE | 103 53 921 A1 | | 6/2005 | |
| DE | 103 53 921 B4 | | 6/2005 | |
| DE | 10 2008 054 694 A1 | | 6/2010 | |
| EP | 0 995 034 B1 | | 4/2000 | |
| GB | 957890 | | 5/1964 | |
| GB | 111217 A | * | 1/2013 | F16D 11/10 |

* cited by examiner

SAFETY BRAKING DEVICE

This application is a 35 U.S.C. § 371 National Stage Application of PCT/EP2019/075279, filed on Sep. 20, 2019, which claims the benefit of priority to Serial No. DE 10 2018 216 573.4, filed on Sep. 27, 2018 in Germany, the disclosures of which are incorporated herein by reference in their entirety.

The disclosure relates to a safety brake device for a power tool.

BACKGROUND

Safety brake devices are known from the prior art, for example from DE 10 2008 054 694 A1.

SUMMARY

The disclosure proceeds from a safety brake device for a power tool for braking a machining tool driven by means of a drive unit, in particular by means of a motor, via an output unit, in particular an output shaft. The safety brake device comprises at least one decoupling device, which is provided to decouple the output unit from the drive unit during a braking operation in order to reduce a rotational mass and/or rotational energy to be braked of the output unit. Furthermore, the safety brake device at least also comprises a brake device having at least one first brake device part and one second brake device part, wherein the first brake device part is arranged on the output unit so as to allow essentially no relative rotation, in particular is arranged on the output shaft of the output unit so as to allow essentially no relative rotation, and wherein the second brake device part is provided to be arranged so as to allow essentially no relative rotation with respect to the power tool. The first brake device part and the second brake device are provided to interact mechanically with one another during a braking operation and in such a way to brake, in particular stop or block, rotation of the output unit. According to the disclosure, the first brake device part of the brake device is embodied in one piece, in particular as one, with the decoupling device.

A "safety brake device" is intended to be understood in particular as being a device that brakes or stops a machining tool by means of at least the brake device in a situation in which the machining tool represents a hazard to a user. In particular, the safety brake device brakes the machining tool when a user approaches or comes into contact with the machining tool. In one embodiment, the safety brake device also comprises a processing unit and a sensor unit, wherein the processing unit communicates with at least one sensor of the sensor unit, wherein the sensor is provided to detect a hazard to a user, in particular the user approaching the machining tool and/or the user coming into contact with the machining tool. Electronics of the safety brake device can then, following detection of the user approaching the machining tool and/or following detection of the user coming into contact with the machining tool, trigger for example an actuator element, which triggers a braking operation using the brake device. The actuator element can be realized in particular as a constituent of the brake device or separately therefrom.

The term "provided" is intended to be understood in particular as meaning especially equipped, designed and/or programmed.

A "power tool" is intended to be understood as meaning in principle any power tool that has a rotatably mounted machining tool driven by means of a drive unit via an output unit, in particular an output shaft. The machining tool can also be realized in particular as a tool receptacle. The machining tool is connected to the output unit so as to allow essentially no relative rotation or is connectable to the output unit so as to allow essentially no relative rotation at least in an operating state of the power tool, for example via a tool receptacle, such that a torque is transmissible from the output unit, in particular the output shaft, to the machining tool. The expression "so as to allow essentially no relative rotation" should be understood at this point as meaning that the machining tool executes a relative rotation of less than 15°, in particular of less than 10°, very particularly of less than 5°, with respect to the output unit during a braking operation. The torque is generated by a drive unit, for example an electric motor, in particular a brushless DC motor (EC motor), and/or some other motor that appears appropriate to a person skilled in the art. An output shaft allows rotation of the machining tool by the output shaft being rotated about its longitudinal axis. Examples of such power tools include in particular drilling machines, string trimmers, lawnmowers, circular saws, bench saws, cross-cut saws, miter saws, or other power tools that appear appropriate to a person skilled in the art. In one embodiment, the power tool can be realized as a portable power tool, for example a cordless battery-operated portable circular saw or the like. In one exemplary embodiment, the power tool can be realized as a portable circular saw having a machining tool in the form of a circular-saw blade that is driven by means of a motor via an output shaft, and having a sensor plate that senses contact of human skin with the machining tool.

The output unit, in particular the output shaft, is connected to the drive unit, in particular the drive shaft, using a transmission or a clutch. The decoupling device is provided to decouple the output unit from the drive unit in terms of driving during a braking operation in order to reduce a rotational mass and/or rotational energy to be braked of the output unit. A "decoupling device" should be understood in particular as being a device that is configured to interrupt a torque transmission between the output unit, in particular the output shaft, and the drive unit, in particular a drive shaft or motor shaft. In one embodiment, the decoupling device is in the form of a claw clutch, a slip clutch, a gear wheel clutch (spur gear clutch or crown gear clutch) and/or of some other decoupling device that appears appropriate to a person skilled in the art. In one embodiment of the safety brake device, the first brake device part is in the form of a spur gear or of a crown gear. The expression "to decouple in terms of driving" is intended to be understood in particular as meaning the interruption of a flow of force and/or a flow of power between the output unit, in particular the output shaft and the tool receptacle, and the drive unit. By way of the decoupling device, a rotating mass, in particular rotational energy, can be reduced and thus a particularly short time until the machining tool has been brought to a standstill, can be achieved. The standstill in this case characterizes the first achievement of the zero point of the rotational speed of the output shaft, regardless of whether (slight) rotation of the drive shaft—for example on account of material relaxation effects—subsequently occurs. As a result of the energy to be compensated (or braked) being reduced during a braking operation, the brake device can furthermore be constructed in a more compact manner and be realized in a more effective manner. At the same time, the decoupling device can act in the coupled state as a transmission, which adapts a rotational speed of the drive shaft, in particular of the motor, to a rotational speed of the output unit, in particular of the output shaft and the machining tool, (for example from 20 000 to 40 000 revolutions per minute to 5000 revolutions per minute).

A "brake device" should be understood as being a device that serves to brake or stop the rotation of the machining tool in the event of detection of a user approaching or coming into contact with the machining tool. The brake device is realized according to the disclosure as an at least two-part brake device, having at least one first brake device part and one second brake device part. In one embodiment of the safety brake device, the first brake device part and the second brake device part are configured as complementary constituents of an at least two-part claw clutch (or equivalent thereto: claw brake), wherein the first brake device part and the second brake device part each have at least one toothing element, which are provided to be engaged with one another during a braking operation and in this way to brake, in particular stop, rotation of the output unit. A "two-part claw clutch" should be understood as being a clutch that functions by form-fitting coupling in that toothing elements on the two brake device parts are brought into engagement with one another and thus allow torque transmission as a consequence of a relative movement of the two brake device parts with respect to one another, in particular as a consequence of a relative movement of the two brake device parts in a direction of rotation with respect to one another. As a result of the safety brake device being realized by means of a claw clutch, a form-fitting connection can be used to carry out a braking operation in a particularly quick and safe manner. The first brake device part is arranged on the output unit, in particular on the output shaft, so as to allow essentially no relative rotation. In one embodiment, the first brake device part can be arranged on the output unit in an axially movable manner or, in a further embodiment, in an axially immovable manner. The second brake device part is provided to be connected to another constituent of the power tool, in particular for example a housing, a transmission housing, a motor housing or some other structure of the power tool, so as to allow essentially no relative rotation, and thus to be arranged at least so as to allow essentially no relative rotation with respect to the power tool. In one embodiment, the second brake device part can be provided to be connected to the other constituent of the power tool in a substantially immovable manner and therefore to be arranged not only so as to allow essentially no relative rotation with respect to the power tool. In one exemplary embodiment, the second brake device part is embodied in a substantially immovable manner with respect to a motor housing of the power tool. In this way, in particular free rotation of the second brake device part with respect to the power tool and also with respect to the output unit, in particular with respect to the output shaft, and thus with respect to the first brake device part, which is connected to the output unit so as to allow essentially no relative rotation, can be prevented.

The expression "so as to allow essentially no relative rotation" should be understood as meaning that a respective brake device part is mounted so as not to be substantially displaceable (rotatable) or able to slide in the direction of the circumference of the output unit, in particular of the output shaft. The expression "the first brake device part is arranged on the output unit so as to allow essentially no relative rotation" should be understood as meaning that the first brake device part is connected to the output unit, in particular the output shaft, so as to corotate with a rotational movement of the output unit, in particular of the output shaft, wherein "substantially" means that a maximum relative movement of the output unit, in particular of the output shaft, and first brake device part with respect to one another is intended to be allowed, which is less than 15°, in particular less than 10°, very particularly less than 5°. In one exemplary embodiment, the maximum admissible relative movement of the first brake device part is 12.5°. In particular, this relative movement occurs only when a very large torque is applied to the first brake device part, as can occur in the case of an abrupt braking operation.

The expression "the second brake device part is arranged so as to allow essentially no relative rotation, in particular arranged so as to allow essentially no relative rotation with respect to the power tool" should be understood as meaning that a maximum relative movement of the constituent of the power tool to which the second brake device part is fastened, and of the second brake device part with respect to one another is intended to be allowed, which is less than 30°, in particular less than 10°, very particularly less than 5°. In one exemplary embodiment, the maximum admissible relative movement of the second brake device part is 15°.

The expression "axially movable/immovable" should be understood as meaning that the first brake device part is mounted so as to be movable or immovable, respectively, in the axial direction of the output unit, in particular of the output shaft.

"Toothing elements" should be understood as being design-related protrusions both of the first brake device part and of the second brake device part, which are provided to be brought into engagement with one another. Here, the toothing elements of one brake device part form at the same time recesses that receive toothing elements of the other brake device part such that, upon interaction of the brake device parts, protrusions (toothing elements) and recesses (depressions between adjacent toothing elements) form pairs that are arranged in a complementary manner to one another. The toothing elements are brought into engagement with one another in the event of a braking operation such that, as a result of torque transmission between the (corotating) first brake device part on the output unit arranged so as to allow essentially no relative rotation and the second brake device part arranged on the power tool so as to allow essentially no relative rotation with respect to the output unit, torque transmission is able to be generated, which counteracts the rotational movement of the first brake device part and in this way brakes, in particular stops or blocks, the rotation of the output unit, in particular of the output shaft. In one embodiment, the toothing elements are provided equidistantly and in particular in such a way on the respective brake device part that—with respect to the axis of rotation of the output unit, in particular of the output shaft—they are arranged in a rotationally symmetric manner thereto.

The expression "in one piece" should be understood in particular as meaning that there is an integral component, which can also be assembled in principle from different components, which are held together for example in a force- and/or form-fitting manner. The term "as one" should be understood in particular as meaning that there is an integral, in particular cohesively bonded, component. In particular, the component does not appear to have been assembled from a plurality of joined-together components that can be detached from one another. Such taking apart therefore cannot take place without the component being destroyed.

According to the disclosure, the first brake device part can serve both for coupling and decoupling the output unit to/from the drive unit and for carrying out the braking operation. Therefore, the disclosure makes it possible, for the function of decoupling/coupling and the function of braking, to use only one assembly (rather than a plurality of assemblies). Therefore, in addition to the number of required components, the installation space requirement of the safety brake device can also be kept small. Furthermore, as a result of the direct linking of the functions in one assembly, the overall functionality can be considerably improved, in particular a braking time can be considerably reduced. Consequently, the disclosure allows the specification of a safety brake device that is improved in terms of functional integration, installation space requirement and manufacturing complexity. Furthermore, on account of the particularly small brake device, the decoupling device, in particular the location of drive-related decoupling, can be arranged particularly close to the machining tool, in order to keep a centrifugal mass to be braked particularly low.

In one embodiment of the safety brake device, the first brake device part is mounted on the output unit, in particular on the output shaft, so as to be movable in an axial direction, and, in the coupled state, couples the output unit to the drive shaft of the drive unit. In particular, the safety brake device comprises a preloading element, which is provided to push at least the first brake device part into a starting position in which the output unit and the drive shaft of the drive unit are in a coupled state.

In one embodiment, of the safety brake device, the safety brake device has at least one actuator element, which is provided, upon identification of a user approaching or coming into contact with the machining tool, to move the first brake device part in the axial direction toward the output unit such that the output unit is able to be decoupled, and is in particular decoupled, from the drive shaft, and the first brake device part is movable, and in particular is moved, toward the second brake device part, in particular counter to a restoring force, such that the toothing elements of the first brake device part and the toothing elements of the second brake device part are brought into engagement with one another. Advantageously, the actuator element brings about a force on the first brake device part in the axial direction of the output unit, in particular of the output shaft. An "actuator element" should be understood in particular as being a device that applies a force to the first brake device part and therefore brings about a movement of the first brake device part. Such actuator elements are known to a person skilled in the art from the prior art. Kinetic energy can be provided in this case by a lever element, a spring element, a transmission element or the like. The movement of the first brake device part initiates the decoupling of the output unit from the drive unit and at the same time the braking operation.

In one embodiment of the safety brake device, the safety brake device has at least one isolation element, which is arranged on or in the first brake device part, wherein the at least one isolation element is provided to electrically isolate the output unit from the drive unit. This makes it possible to ensure that the output unit, in particular the output shaft together with the machining tool, does not have an influence on an in particular capacitive measurement by means of the sensor of the power tool. In one exemplary embodiment, the isolation element can be realized as a plastics layer applied to the decoupling device, in particular to a spur gear.

As a result of the design according to the disclosure of the safety brake device, a particularly advantageous braking action or braking effectiveness can be achieved taking the robustness, reaction time, braking time etc. of the brake device into consideration. In particular, on account of the configuration according to the disclosure of the brake device of the safety brake device, particularly high functional integration together with particularly high braking effectiveness, i.e. with a particularly short time between the braking operation being triggered and the standstill of the machining tool, can be achieved in a structurally particularly simple manner. The brake device reacts particularly quickly after the actuator element has been triggered, in order to avoid or entirely rule out injuries to the operator in the event of encroachment into the moving machining tool. Furthermore, the brake device of the safety brake device can be realized in a structurally particularly simple manner and therefore also in a particularly reliable manner.

Furthermore, the disclosure relates to a power tool, in particular a portable power tool, in particular a portable circular saw having a machining tool in the form of a circular-saw blade, comprising a safety brake device according to the disclosure. In this way, in order to brake a movement, in particular a rotation, of the machining tool, a particularly short braking time, ascertained between triggering of a braking operation and the stopping of the machining tool, is achieved. In particular, this maximum braking time (after the braking operation has been triggered by the actuator) is less than 5 milliseconds, in particular less than 3 milliseconds, very particularly less than 1.5 milliseconds. In one exemplary embodiment, the maximum braking time is 2.8 seconds. In this way, the safety of a user of the power tool can be increased considerably.

In one exemplary embodiment of the power tool, the latter also has a sensor plate, which detects a user approaching or coming into contact with the machining tool, in particular contact of human skin with the machining tool. Following detection of a user approaching or coming into contact with the machining tool, electronics of the power tool initiate the triggering of the actuator element, which thereupon triggers a braking operation. In this case, the actuator element actively moves the first brake device part in order to bring the two brake device parts into engagement with one another during a braking operation and in this way brake, in particular stop, rotation of the output unit, in particular of the output shaft. At the same time, as a result of the movement of the first brake device part, the actuator element decouples the output unit from the drive unit.

BRIEF DESCRIPTION OF THE DRAWINGS

The disclosure is explained in more detail in the following description by way of exemplary embodiments illustrated in the drawings. The drawings, the description and the disclosure contain numerous features in combination. A person skilled in the art will expediently also consider the features individually and combine them to form useful further combinations. Identical reference signs in the figures denote identical elements.

In the figures.

DETAILED DESCRIPTION

Figure 1:
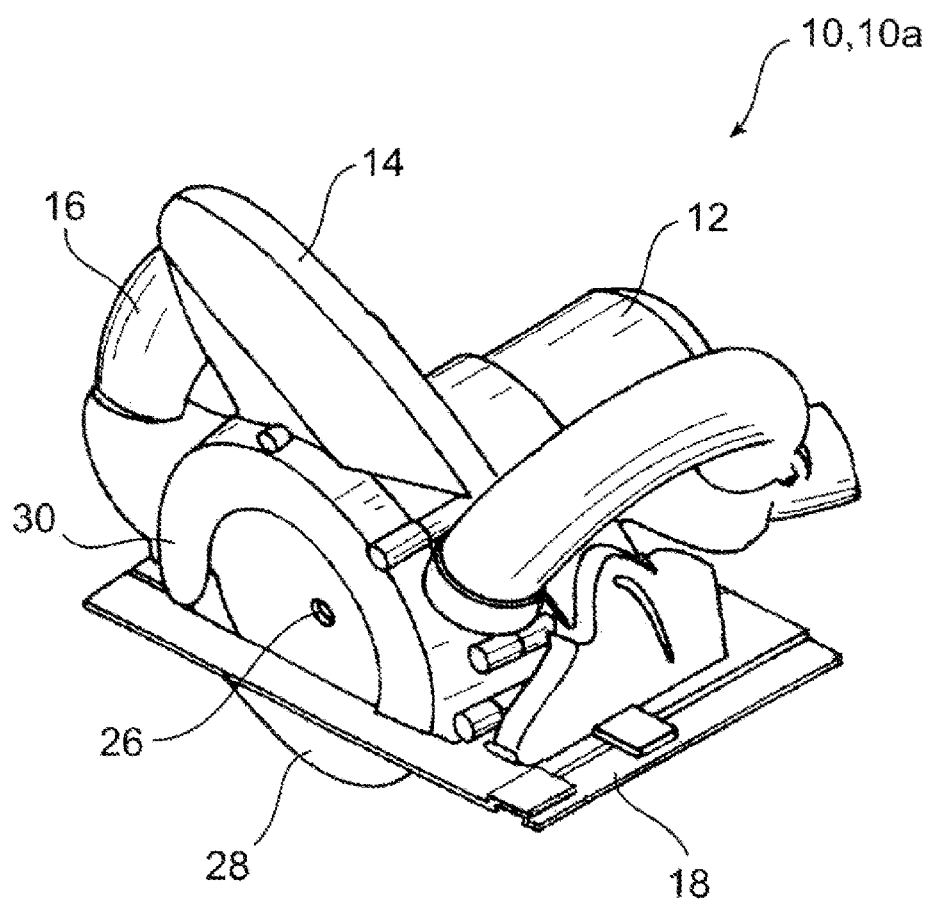
FIG. 1: shows a perspective illustration of a power tool according to the disclosure.

FIG. 1 shows a power tool 10 according to the disclosure, which is realized as a portable circular saw 10a. It should be noted that the embodiments should not be understood as being limited to a portable circular saw 10a, but rather the technical teachings underlying the embodiments are also transferable in principle to any other power tools that appear appropriate to a person skilled in the art, in particular for example drilling machines, lawnmowers, string trimmers or the like.

The portable circular saw 10*a* comprises a first housing, which is in the form of a motor housing 12, and a second housing 14. The portable circular saw 10*a* has a handle 16 and a base plate 18 for guiding the portable circular saw 10*a*. To be supplied with energy, the portable circular saw 10*a* has a grid connection (not illustrated in more detail here). In an alternative or additional embodiment of the portable circular saw 10*a*, operation of the portable circular saw 10*a* independently of the power grid can also be provided using a rechargeable battery.

Figure 2:
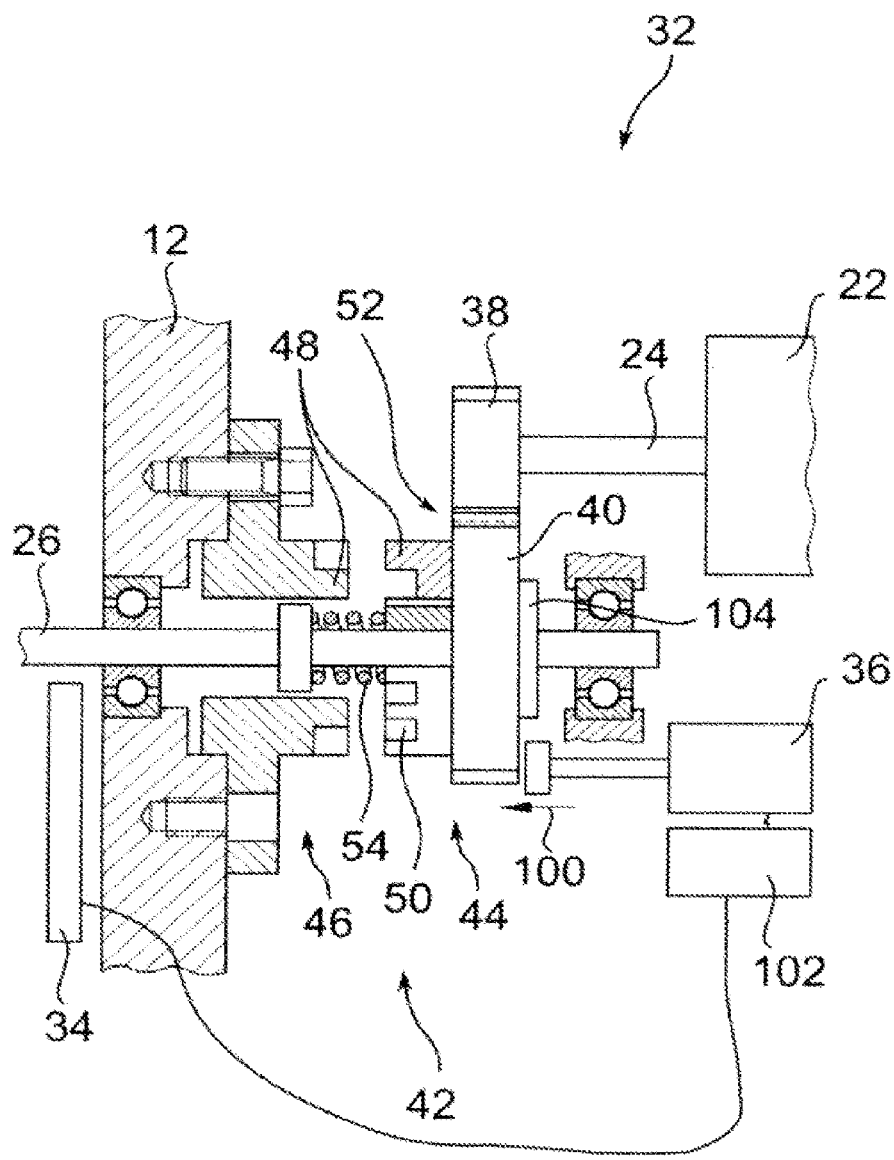
FIG. 2: shows a schematic illustration of a sectional illustration through parts of the power tool together with a safety device according to the disclosure and brake device.

The motor housing 12 encloses an interior in which at least one drive unit in the form of an electric motor drive is arranged. As illustrated in FIG. 2, a motor 22 of the drive unit drives a machining tool 28 (cf. FIG. 1) in rotation during a work operation via a drive shaft 24, in particular a motor shaft, and an output shaft 26. The machining tool 28 is in the form of a saw blade, in particular of a circular saw blade, here. A saw blade cover 30 prevents contact from being made with the machining tool 28 and provides protection from chips of a workpiece that are thrown out by the machining tool 28 (cf. FIG. 1).

A safety brake device 32 is provided for braking the machining tool 28 as soon as contact or proximity of a human body part, for example a hand, is detected by a sensor 34 of the portable circular saw 10*a*. The sensor 34 is realized by a capacitively measuring sensor in this exemplary embodiment. The sensor 34 makes it possible to detect a body part approaching the machining tool 28 on the basis of capacitive measurements (for example by means of an alternating field), wherein, following detection, a detection signal is generated and output to a control device of the portable circular saw 10*a* (cable connection in FIG. 2).

The safety brake device 32 comprises an actuator element 36, which is provided to trigger a braking operation following detection of a human body part coming into contact with or approaching the machining tool 28. Here, triggered by the reception of the detection signal from the sensor 34, electronics 102 (not illustrated in detail here) of the safety brake device 32 initiate a flow of current through the actuator element 36, with the result that the actuator element 36 initiates a braking operation in that the actuator element 36 acts on the proper functionality (i.e. the rotation) of the output shaft 26 and brakes or stops the latter.

FIG. 2 also shows a first gear wheel 38, which is arranged on the drive shaft 24 and meshes with a second gear wheel 40 arranged on the output shaft 26. In this way, the first gear wheel 38 and second gear wheel 40 form a safety clutch and a transmission stage. In particular, the safety clutch protects the drive unit, in particular the motor 22, from damage that can be caused by blocking of the machining tool. Furthermore, by means of the safety clutch, the mass and energy to be braked during a braking operation can be reduced in that the drive shaft 24 is decoupled from the output shaft 26. In this way, a particularly short braking time can be allowed.

The safety brake device 32 also comprises a decoupling device 52, which is provided to decouple the output unit, in particular the output shaft 26, from the drive unit, in particular the drive shaft 24, in terms of driving during a braking operation, in order to reduce a rotational mass to be braked of the output unit. To this end, the second gear wheel 40 (spur wheel) is arranged on the output shaft 26 in an axially displaceable manner, while it is secured against rotating by profiling both of the second gear wheel 40 and of the output shaft 26. During proper operation (i.e. without a braking operation), a spring element 54 keeps the second gear wheel 40 in a coupled position in that it is pushed against a stop element 104 on the output shaft 26. In the coupled position, a torque can be reliably transmitted from the drive shaft 24 to the output shaft 26 via the first gear wheel 38 and the second gear wheel 40. The second gear wheel 40, in particular the spur gearing thereof, thus forms the decoupling device 52. By means of the actuator element 36, during a braking operation and decoupling operation, a force can be exerted on the second gear wheel 40 in the axial direction 100 of the output shaft 26. If the force exceeds the preloading force exerted by the spring element 54, the second gear wheel 40 on the output shaft 26 can be axially moved away from the stop 104 until the tooth engagement between the first gear wheel 38 and second gear wheel 40 is disengaged. In this way, the output unit, in particular the output shaft 26, can be decoupled from the drive unit, in particular the drive shaft 24.

The safety brake device 32 has at least one brake device 42, comprising at least one first brake device part 44 and one second brake device part 46. The first brake device part 44 is arranged on the output unit so as to allow essentially no relative rotation, in particular arranged on the output shaft 26 of the output unit so as to allow essentially no relative rotation. The second brake device part 46 is arranged so as to allow essentially no relative rotation, in particular arranged so as to allow essentially no relative rotation with respect to the motor housing 12 of the power tool 10. The first brake device part 44 and the second brake device part 46 are provided to interact mechanically with one another during a braking operation and in this way to brake, in particular stop, rotation of the output unit, in particular of the output shaft 26. As illustrated in FIG. 2, the first brake device part 44 of the brake device 42 is embodied in one piece, in particular as one, with the decoupling device 52. In this way, components required for carrying out a braking operation are connected (in one piece) to the second gear wheel 40 or manufactured directly integrally (as one) with the second gear wheel 40. In the exemplary embodiment illustrated, the brake device 42 is in the form of an at least two-part claw clutch with a first claw-clutch part and a second claw-clutch part, wherein the first claw-clutch part is realized by the first brake device part 44 and is arranged on the output shaft 26 so as to allow essentially no relative rotation and so as to be axially movable, and the second claw-clutch part is realized by the second brake device part 46 and is arranged so as to allow essentially no relative rotation with respect to the motor housing 12 of the power tool 10. The two brake device parts 44, 46 each have eight toothing elements 48, which are provided to be engaged with one another during a braking operation and in this way to brake, in particular stop, rotation of the output shaft 26.

During a braking operation, the first brake device part 44 is moved axially along the output shaft 26 in the direction of the second brake device part 46. As a result of the axial movement of the first brake device part 44 toward the second brake device part 46, the first brake device part 44 and second brake device part 46 are coupled together, i.e. the clutch is closed. The toothing elements 48 of the first brake device part 44 and of the second brake device part 46 consequently engage in one another and form a form fit. On account of the form fit, a torque directed counter to the rotation of the output shaft 26 acts between first brake device part 44 and second brake device part 46. Consequently, the rotation of the output shaft 26 and of the first brake device part 44 is braked, in particular stopped or blocked.

In one exemplary embodiment, the second brake device part is secured to the stationary motor housing 12 substantially so as not to rotate with respect to the motor housing 12. In this case, the brake device part 46 can rotate through no more than 15°, preferably through no more than 10°, with respect to the motor housing 12. In particular, however, slight rotation is explicitly allowed in order to absorb force peaks and thus to act in a damping manner. Furthermore, in further exemplary embodiments (not illustrated in more detail here), separate elements can be provided for elastic deformations in the interface of the second brake device part 46 with the motor housing 12, in particular springs, bending bars, elastomers, damping sleeves, etc.

Figure 3:
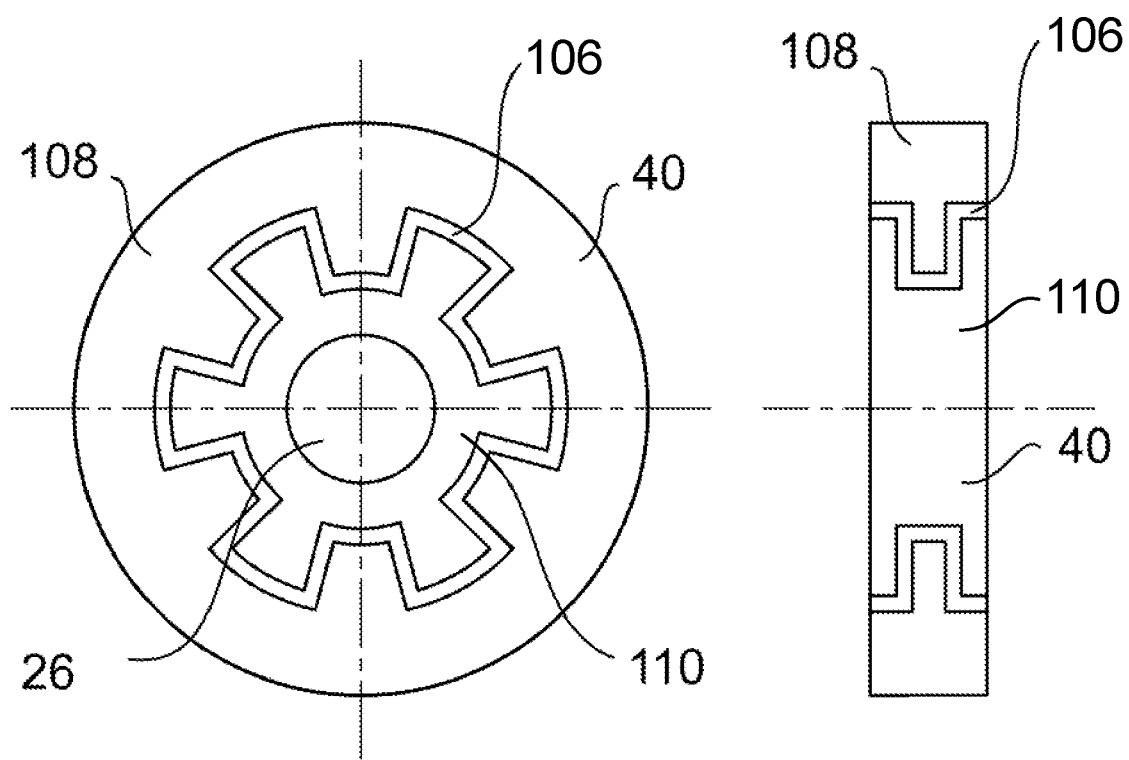
FIG. 3: shows two schematic views of a decoupling device according to the disclosure together with an isolation element.

Finally, FIG. 3 illustrates that the safety brake device 32 has at least one isolation element 106, which is arranged on the first brake device part 44, in particular the decoupling device 52, wherein the at least one isolation element 106 is provided to electrically isolate the output unit, in particular the output shaft 26, from the drive unit, in particular the drive shaft 24. In this way, the output unit, in particular the output shaft 26 can be electrically isolated from the rest of the power tool 10, such that in particular capacitively measuring sensors 34 do not have their functionality restricted. The isolation element 106 is fitted in the second gear wheel 40 and consists preferably of a plastics element or ceramic element. The isolation element electrically separates an external region 108 of the second gear wheel 40 from an internal region 110, wherein the internal region 110 is in contact with the output shaft 26.

The invention claimed is:

1. A safety brake device for a power tool for braking a machining tool driven by means of a drive unit via an output unit including an output shaft, comprising:
   a decoupling device, configured to decouple the output unit from the drive unit during a braking operation thereby reducing at least one of a rotational mass and rotational energy to be braked of the output unit; and
   at least one brake device comprising at least one first brake device part and one second brake device part, wherein the first brake device part is arranged on the output shaft of the output unit so as to allow essentially no relative rotation, and wherein the second brake device part is configured to allow essentially no relative rotation with respect to the power tool, and the first brake device part and the second brake device part are configured to interact mechanically with one another during a braking operation and in such a way to stop rotation of the output unit,
   wherein the first brake device part of the brake device is embodied in one piece with the decoupling device, and
   wherein the first brake device part and the second brake device part each includes a plurality of toothing elements, and the at least one brake device is configured such that, during the braking operation, the first brake device part is moved axially along the output shaft in a direction toward the second brake device part so as to couple the first and second brake device parts in such a way that the plurality of toothing elements of the first brake device part interlock with the plurality of toothing elements of the second brake device part in a form fit.

2. The safety brake device as claimed in claim 1, wherein:
   the first brake device part and the second brake device part are configured as complementary constituents of an at least two-part claw clutch; and
   the engagement of the plurality of toothing elements of the first brake device part and the plurality of toothing elements of the second brake device part during the braking operation stops rotation of the output unit.

3. The safety brake device as claimed in claim 1, wherein the first brake device part is in the form of one of a spur gear and a crown gear.

4. The safety brake device as claimed in claim 1, wherein the first brake device part is mounted on the output shaft of the output unit so as to be movable in an axial direction and, in a coupled state, couples the output unit to a drive shaft of the drive unit.

5. The safety brake device as claimed in claim 4, wherein the safety brake device comprises at least one preloading element configured to push at least the first brake device part into a starting position in which the output unit and the drive unit are in the coupled state.

6. The safety brake device as claimed in claim 4, wherein the safety brake device has at least one actuator element, which is configured, upon identification of a user approaching or coming into contact with the machining tool, to move the first brake device part in the axial direction toward the output unit such that the output unit is decoupled from the drive shaft, and the first brake device part is moved toward the second brake device part counter to a restoring force.

7. The safety brake device as claimed in claim 1, wherein:
   the safety brake device has at least one isolation element, which is arranged on or in the first brake device part; and
   the at least one isolation element is configured to electrically isolate the output unit from the drive unit.

8. A portable power tool, comprising:
   a decoupling device, configured to decouple an output unit from a drive unit during a braking operation thereby reducing at least one of a rotational mass and rotational energy to be braked of the output unit; and
   at least one brake device comprising at least one first brake device part and one second brake device part, wherein the first brake device part is arranged on an output shaft of the output unit so as to allow essentially no relative rotation, and wherein the second brake device part is configured to allow essentially no relative rotation with respect to the power tool, and the first brake device part and the second brake device part are configured to interact mechanically with one another during a braking operation and in such a way to stop rotation of the output unit,
   wherein the first brake device part of the brake device is embodied in one piece with the decoupling device, and
   wherein the first brake device part and the second brake device part each include a plurality of toothing elements, and the at least one brake device is configured such that, during the braking operation, the first brake device part is moved axially along the output shaft in a direction toward the second brake device part so as to couple the first and second brake device parts in such a way that the plurality of toothing elements of the first brake device part interlock with the plurality of toothing elements of the second brake device part in a form fit.

* * * * *